United States Patent [19]

Harris

[11] Patent Number: 5,272,889
[45] Date of Patent: Dec. 28, 1993

[54] PULLEY MOUNTING AND BEARING SYSTEM FOR AIR CONDITIONERS WITH DUAL TANGENTIAL BLOWERS

[75] Inventor: James E. Harris, Murfreesboro, Tenn.

[73] Assignee: Inter-City Products Corporation (USA), Lavergne, Tenn.

[21] Appl. No.: 934,123

[22] Filed: Aug. 21, 1992

[51] Int. Cl.⁵ .............................................. F25D 17/06
[52] U.S. Cl. .................................... 62/429; 62/262; 403/1; 403/315; 403/318; 403/365; 403/372
[58] Field of Search ................. 62/262, 263, 429, 428; 165/75; 474/903; 403/1, 315, 316, 318, 359, 365, 372

[56] References Cited

U.S. PATENT DOCUMENTS

| | | | |
|---|---|---|---|
| 2,323,511 | 7/1943 | Baker | 62/129 |
| 2,499,411 | 3/1950 | Pennington | 62/6 |
| 2,794,691 | 6/1957 | Noe | 308/72 |
| 3,200,609 | 8/1965 | Laing | 62/280 |
| 3,269,204 | 8/1966 | Schleicher | 74/424.5 |
| 3,301,003 | 1/1967 | Laing | 62/324 |
| 3,353,639 | 11/1967 | Andriussi | 192/41 |
| 3,404,539 | 10/1968 | Laing | 62/262 |
| 3,618,411 | 12/1969 | Rottweiler | 474/903 |
| 3,626,743 | 12/1971 | Koch | 72/330 |
| 3,700,271 | 10/1972 | Blaurock | 287/52.04 |
| 3,776,653 | 12/1973 | Buzogany | 287/52.04 |
| 3,808,661 | 5/1974 | Carlsson | 29/200 |
| 3,838,928 | 10/1974 | Blaurock | 403/372 |
| 4,100,764 | 7/1978 | Murano | 62/289 |
| 4,111,000 | 9/1978 | Sakazume | 62/262 |
| 4,367,636 | 1/1983 | Sakuma | 62/262 |
| 4,478,053 | 10/1984 | Yano | 62/262 |
| 4,603,597 | 8/1986 | Onorati | 474/903 |
| 4,645,361 | 2/1987 | Lakin | 384/441 |
| 4,688,952 | 8/1987 | Setele | 384/537 |
| 4,790,683 | 12/1988 | Cramer | 403/372 |
| 4,804,277 | 2/1989 | Counoupas | 384/493 |
| 5,059,042 | 10/1991 | Grierson | 384/537 |

FOREIGN PATENT DOCUMENTS 60-62530 4/1985 Japan.

Primary Examiner—John M. Sollecito
Attorney, Agent, or Firm—Baker & Daniels

[57] ABSTRACT

The present invention involves an air conditioner including an air handling housing having a sidewall and defining first and second compartments. First and second tangential blowers are disposed in the first and second compartments, respectively. Each of the tangential blowers defines an axis with a coaxially disposed shaft end mounted in the sidewall. A motor drives the first and second tangential blowers. A belt and two pulleys rotatably connect the first and second tangential blowers. The belt engages the pulleys, and each pulley is mounted on a respective one of the shaft ends by a tolerance ring. A bearing assembly for rotatably supporting the shaft ends includes a support plate spaced from the sidewall. The bearing assembly further includes an outer race and an inner race. The outer race is connected to the support plate and the inner race is connected to the shaft end. The support plate is spaced from the side wall to inhibit heat transfer between the first and second compartments and the bearing assembly.

25 Claims, 4 Drawing Sheets

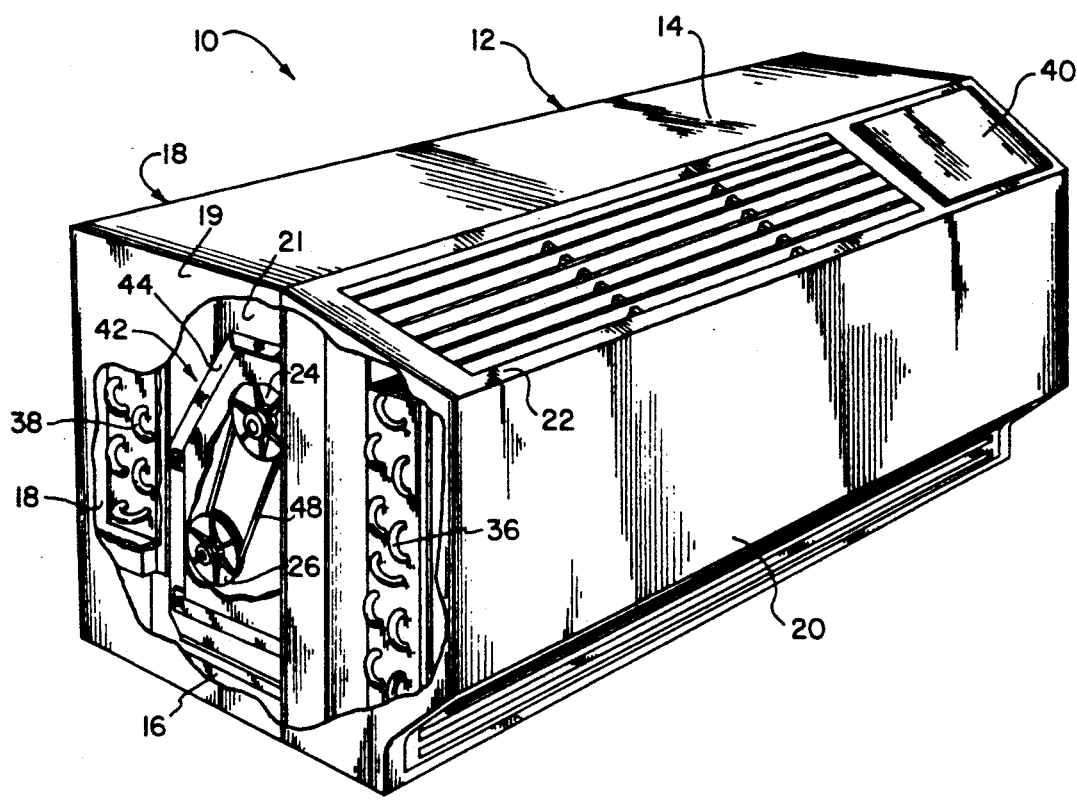
FIG. 1
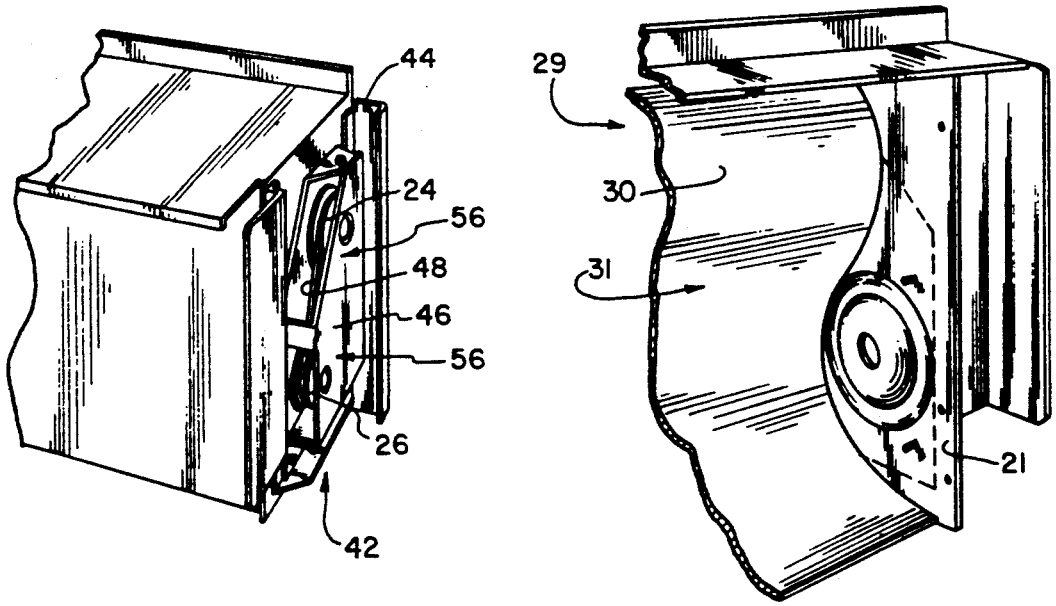
FIG. 2
FIG. 3

PULLEY MOUNTING AND BEARING SYSTEM FOR AIR CONDITIONERS WITH DUAL TANGENTIAL BLOWERS

BACKGROUND OF THE INVENTION

1. Field of the Invention

The present invention relates to air conditioners and heat pumps having dual tangential blowers. More particularly, the field of the invention is that of pulley mounting and bearing systems for the tangential blowers of such air conditioners.

2. Description of the Related Art

Many known air conditioners may be installed in windows or other apertures of building walls in order to provide heating and/or cooling to the building interior. The air conditioners generally include both a conventional tangential blower for the indoor heat exchanger and an axial blower for the outdoor heat exchanger. The air conditioners also include some type of dividing wall which separates the indoor compartment of the unit from the outdoor compartment of the unit. Air is conventionally drawn into the unit through the sides, the rear, the outside, or the bottom of the unit and is blown out of the unit after passing over the heat exchangers.

One known type of air conditioner, termed a "packaged terminal" air conditioner or heat pump, is especially well adapted for use in light commercial and residential applications, e.g., hotel rooms or nursing homes. In those applications, both the non-obtrusive operation and ease of access and servicing of the air conditioner are important features; the hotel or nursing home owner generally desires an air conditioner which does not disturb the guests or residents and which may be quickly repaired so that the building space may be utilized for housing guests. Thus, the comfort of the resident is enhanced because of smooth and quiet running of the air conditioner, and the cost may be reduced through more efficient operation.

Such packaged terminal air conditioners may advantageously include tangential blowers for circulating air about the heat exchangers. Air conditioners which have tangential fans for moving air are much more quiet than conventional units because of the lower air velocity through the blowers and optimum spacing between the blower and the cut-off of the air conditioner. Furthermore, the induced air flow through the heat exchanger coils is much more uniform than in conventional units thereby causing substantially full utilization of the indoor and outdoor heat exchanger coils and providing greater efficiency of the appliance.

Further details of a packaged terminal air conditioner are disclosed in U.S. Pat. Nos. 5,094,089, entitled DRIVING SYSTEM FOR DUAL TANGENTIAL BLOWERS IN AN AIR CONDITIONER, No. 5,038,577, entitled AIR INTAKE ARRANGEMENT FOR AIR CONDITIONER WITH DUAL CROSS FLOW BLOWERS, No. 5,060,720, entitled METHOD AND APPARATUS FOR COOLING MOTORS OF CROSS FLOW BLOWERS, and No. 5,152,336, Ser. No. 07/654,305, filed on Feb. 12, 1991, entitled AIR CONDITIONER MODULAR UNIT WITH DUAL CROSS FLOW BLOWERS, all assigned to the assignee of the present invention, the disclosures of which are incorporated herein by reference.

In the aforementioned U.S. patents, a belt and pulley coupling is described that utilizes a single motor to directly drive one of the tangential blowers which then transmits motion via the belt and pulley coupling to the other tangential blower. The tangential blowers are disposed in an air handling housing which is separated into indoor and outdoor sections by a scroll shaped divider wall. The motor is disposed on the side of the air handling unit adjacent to the compressor while the coupling is mounted on an access cover on the other side of the air handling unit. By positioning the coupling away from the motor and compressor, the belt of the coupling is exposed to much less heat, moisture, and other by-products of the motor and compressor.

The tangential blower includes a pair of end discs which are attached by a plurality of blades. An axially disposed shaft is attached to the discs for mounting to the access cover of the air handling unit. The pulleys of the coupling include a hub portion which may be secured to the blower shaft by a set screw or the like. The shaft is mounted in a bearing located in the access cover to rotatably support the tangential blower. The forming of and steps necessary to assemble the multiplicity of parts complicates the manufacture of the air conditioner.

An undesirable consequence of this arrangement is that air is drawn through the small clearance between the blower shaft and the aperture in the access cover. This induced air stream is generally at a substantially different temperature than that in the interior of the air handler, and moisture often condenses within and on the bearing as the air traverses into the interior of the air handler. Because a substantial temperature difference may exist between the indoor compartment and the conditions exterior to the air handling unit, the bearing in the access cover may be subject to additional stress from temperature variation and performance deterioration due to moisture.

What is needed is an air conditioner which improves the blower coupling arrangement.

Also needed is an air conditioner which improves the blower mounting arrangement.

An additional need is for such an air conditioner which is simpler to manufacture.

A further need is for an air conditioner having a blower bearing removed from the access cover.

SUMMARY OF THE INVENTION

The present invention is a pulley mounting and bearing system for air conditioners with dual tangential blowers. In an air conditioner with dual tangential blowers which are connected by a belt and pulley, the pulleys are connected to the tangential blower shafts by a resilient attachment which facilitates manufacture and servicing. Further, the blower is mounted in a bearing which is similarly connected to the blower shaft.

The frictional mounting of the pulley and/or the bearing elements includes a tolerance ring which eliminates the portion of those elements needed for forming holes to accommodate set screws or the like; furthermore the required width of those elements are reduced. The tolerance ring uniformly distributes torsional stress along its entire circumference, unlike a set screw or similar arrangement which may be more subject to damage from normal use. This is especially important for bearings which may have their inner races distorted by uneven application of radial stresses typically introduced through the use of an interference fit. Additionally, the tolerance rings maximize the thermal isolation of the pulley or bearing from the shaft, which is often at a much different temperature than the exterior. Also, the tolerance rings are easily installed and removed. However, the tolerance ring connection is still capable of rotationally securing the pulleys so that motion is transmitted from the driving pulley to the driven pulley.

An additional feature of the invention is that the bearing is located in a position which is disposed away from the access cover, or "out-board" of the drive coupling elements, thus isolating the bearing from the thermal variation and moisture which may occur proximate the access cover. An additional aspect of the bearing mounting involves the isolator which allows for minor adjustments in location and prevents penetration of most air or other fluids to the bearing. By locating the bearing away from the access cover and at the end of the blower shaft in the isolator, the bearing may be effectively separated from potentially damaging ambient conditions.

The bearing is advantageously positioned within a plate which is attached in spaced relation to the access cover. A resilient bearing isolator, in the form of a cup-shaped elastomeric piece mounted in an aperture of the bearing plate, holds the bearing on the end of the shaft away from the access cover and hermetically seals one side of the bearing. The elastomeric material allows for slight repositioning of the bearing to compensate for the required axial alignment of the blower. Slight misalignment of the blower mounting holes is commonly caused by small variations in manufacturing the apertures in the sheet metal parts of the air handler. Further, the body of the isolator prevents drafts of air from flowing through the bearing and leaving moisture in the ball bearings.

The manufacture of the belt and pulley coupling of air conditioners is greatly facilitated by the stepped profile of the blower shaft employed in the pulley mounting and bearing system of the present invention. The tolerance rings are easily located on the blower shaft because the shaft provides a recess for the ring of the pulley and an end abutment for the ring of the bearing. Then the pulley and bearing are easily pushed over the shaft and tolerance rings to form a secure frictional engagement which rotationally couples the pulley with the shaft.

Maintenance of the bearings is also greatly facilitated by the arrangement of the present invention. The elastomeric isolator allows easy insertion and removal of the bearing from the bearing plate. The tolerance rings allow the pulley and the bearing to be easily detached from the blower shaft by axial movement. No set screws or other structures are required, and no specialized tools are required for the removal and replacement of the bearing, pulley, or tolerance rings besides the screw driver or the like needed to attach and separate the bearing plate. Thus, the time required to service the bearings, belt and pulley system is reduced without requiring any special equipment.

The present invention, in one form, is an air conditioner including an air handling housing defining first and second compartments and including a sidewall. A first and second tangential blower are respectively disposed in the first and second compartments. Each of the tangential blowers defines an axis and has a coaxially disposed shaft end mounted in the sidewall. A motor means drives the first and second tangential blowers. A coupling means rotatably connects the first and second tangential blowers. The coupling means includes a belt and two pulleys. The belt engages the pulleys and the pulleys are mounted on a respective one of the shaft ends. A frictional engagement means rotationally couples the pulley to the shaft end, i.e., a tolerance ring having a plurality of raised portions.

In another embodiment of the invention, the air conditioner further includes a bearing means for supporting at least one of the shaft ends. The bearing means includes means for frictionally engaging the shaft end, i.e., a tolerance ring having a plurality of raised portions for rotationally engaging the respective shaft end. The tolerance ring inhibits heat transfer from the shaft end to the bearing means.

The present invention, in another form, is an air conditioner including an air handling housing having a sidewall and defining first and second compartments. First and second tangential blowers are disposed in the first and second compartments, respectively. Each of the tangential blowers defines an axis with a coaxially disposed shaft end mounted in the sidewall. A motor means drives the first and second tangential blowers. A coupling means for rotatably connecting the first and second tangential blowers includes a belt and two pulleys. The belt engages the pulleys and each pulley is mounted on a respective one of the shaft ends. A bearing means for rotatably supporting one of the shaft ends is disposed on the one shaft end and includes a support plate spaced away from the sidewall. The bearing means further includes an outer race and an inner race. The outer race is connected to the support plate and the inner race is connected to the shaft end. The support plate is spaced from the side wall to inhibit heat transfer from the first and second compartments to the bearing means.

One object of the invention is to provide an air conditioner which improves the blower coupling arrangement.

Also an object of the invention is to provide an air conditioner which improves the blower mounting arrangement.

An additional object is to provide such an air conditioner which is simpler to manufacture.

A further object is to provide an air conditioner having a blower bearing removed from the access cover.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view, in partial cut-away, of a packaged terminal air conditioner with the pulley mounting and bearing system of the present invention.

FIG. 2 is a perspective view, taken from the side and rear of the air handling unit, showing the pulleys and bearing mounting plate.

FIG. 3 is a perspective view, taken from the middle and rear of the air handling unit, showing the blower shaft clearance hole portion of the access cover.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 4:
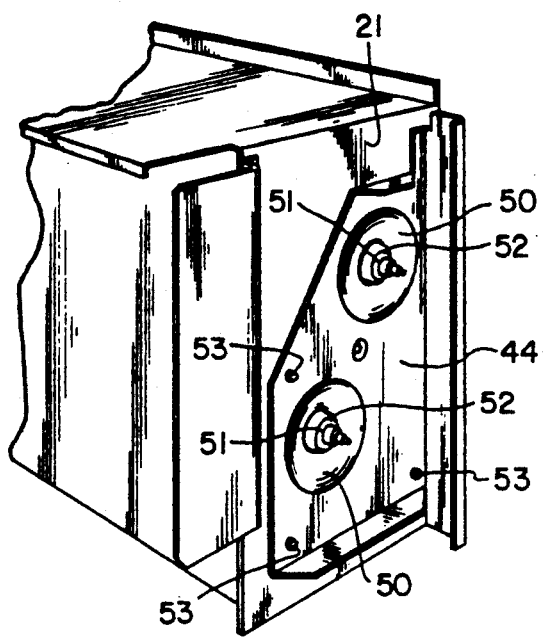
FIG. 4 is a perspective view, taken from a perspective similar to that of FIG. 2, but with the bearing mounting plate and pulleys removed.

Referring now to the drawings, and in particular FIG. 1, there is shown a package terminal air conditioner (PTAC) 10. PTAC 10 generally includes a cabinet 12 having a top wall 14, a base pan 16, rear wall 18, front wall 20, sidewall 19 and louvered discharge panel 22. Further details of a PTAC are disclosed in U.S. Pat. No. 5,094,089 to Lail (the Lail patent), which is assigned to the Assignee of the present invention and incorporated herein by reference.

PTAC 10 has an internal construction similar to the PTAC disclosed in the Lail patent. An air handling housing is generally defined by top wall 14, base pan 16, rear wall 18, front wall 20, a side wall 21 and a second side wall (not shown) extending parallel to side wall 21 and disposed on the other side of the air handling housing.

Figure 14:
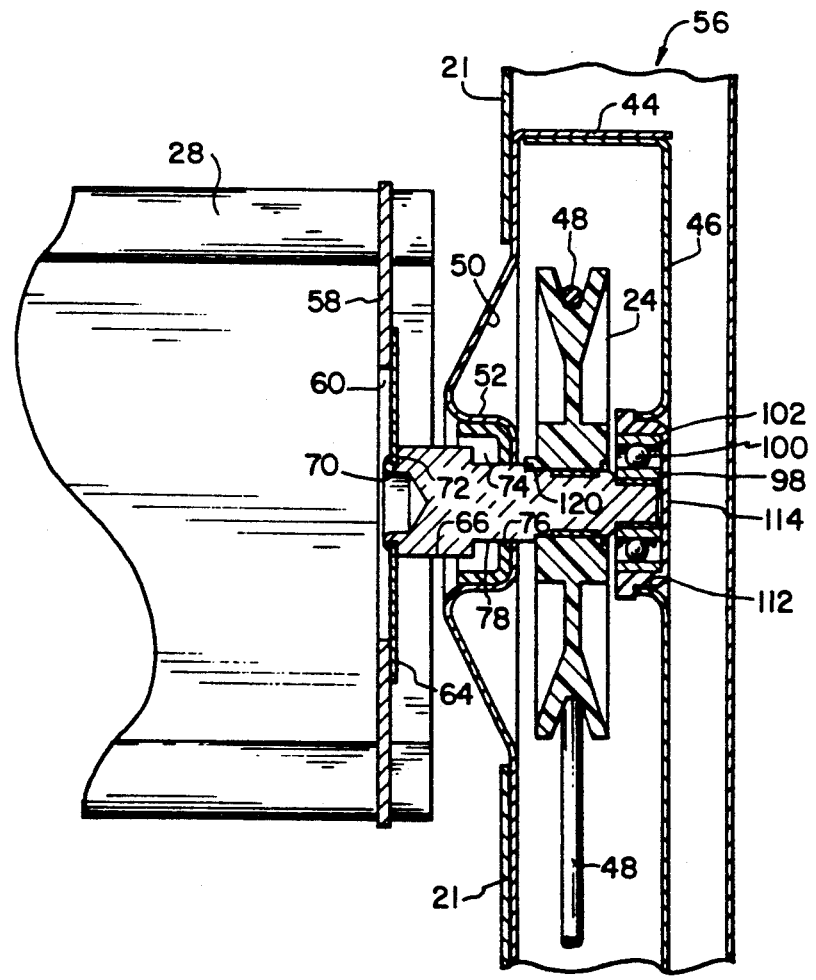
FIG. 14 is a sectional view of one pulley of the pulley mounting and bearing system of the present invention.

Disposed at one end of the air handling housing are pulleys 24 and 26 rotatably connected therebetween by belt 48. Pulleys 24 and 26 are respectively secured to first and second tangential blowers. FIG. 14 illustrates tangential or cross-flow blower 28 which is secured to pulley 24. Disposed between the tangential blowers is a scroll shaped divider wall 30 forming an indoor or first compartment 29 (FIG. 3) having a first tangential blower 28 disposed therein, and an outdoor or second compartment 31 having a second tangential blower 28 disposed therein. Second tangential blower 28 is secured to pulley 26 which in turn is rotatably connected to pulley 24 via belt 48. Other conventional components which are respectively disposed in indoor compartment 29 and outdoor compartment 31 include indoor and outdoor cutoff partitions (not shown), and indoor and outdoor heat exchanger coils 36 and 38 respectively (FIG. 1).

Disposed at the other end of the air handling housing adjacent the louvered discharge panel 22 is a control cover 40 disposed over a control unit (not shown). As is known, the control unit is operably connected to refrigeration components (not shown) disposed at the end of cabinet 12 adjacent the control cover 40 and control unit. Refrigeration components may include a compressor, accumulator, associated valves and refrigerant lines. An electric motor is also disposed in the same general area as the refrigeration components within the cabinet 12 and rotatably drives one of the tangential blowers.

Referring now to FIGS. 1 and 2, there is shown belt drive 42 of the present invention. Belt drive 42 generally includes access cover 44, support plate or bearing panel 46, and pulley and bearing assemblies 56 connected therebetween by belt 48.

Access cover 44 (FIG. 4) is formed with a pair of generally frustoconical shaped recesses 50 and raised portion 52 having centrally located opening 51 therein. Screws 53 allow attachment of the access cover 44 to side wall 21 of cabinet 12. An opening (not numbered) may be formed in access cover 44 to provide clearance for a screw (not shown) which secures side wall 21 to scroll divider wall 30.

Figure 5:
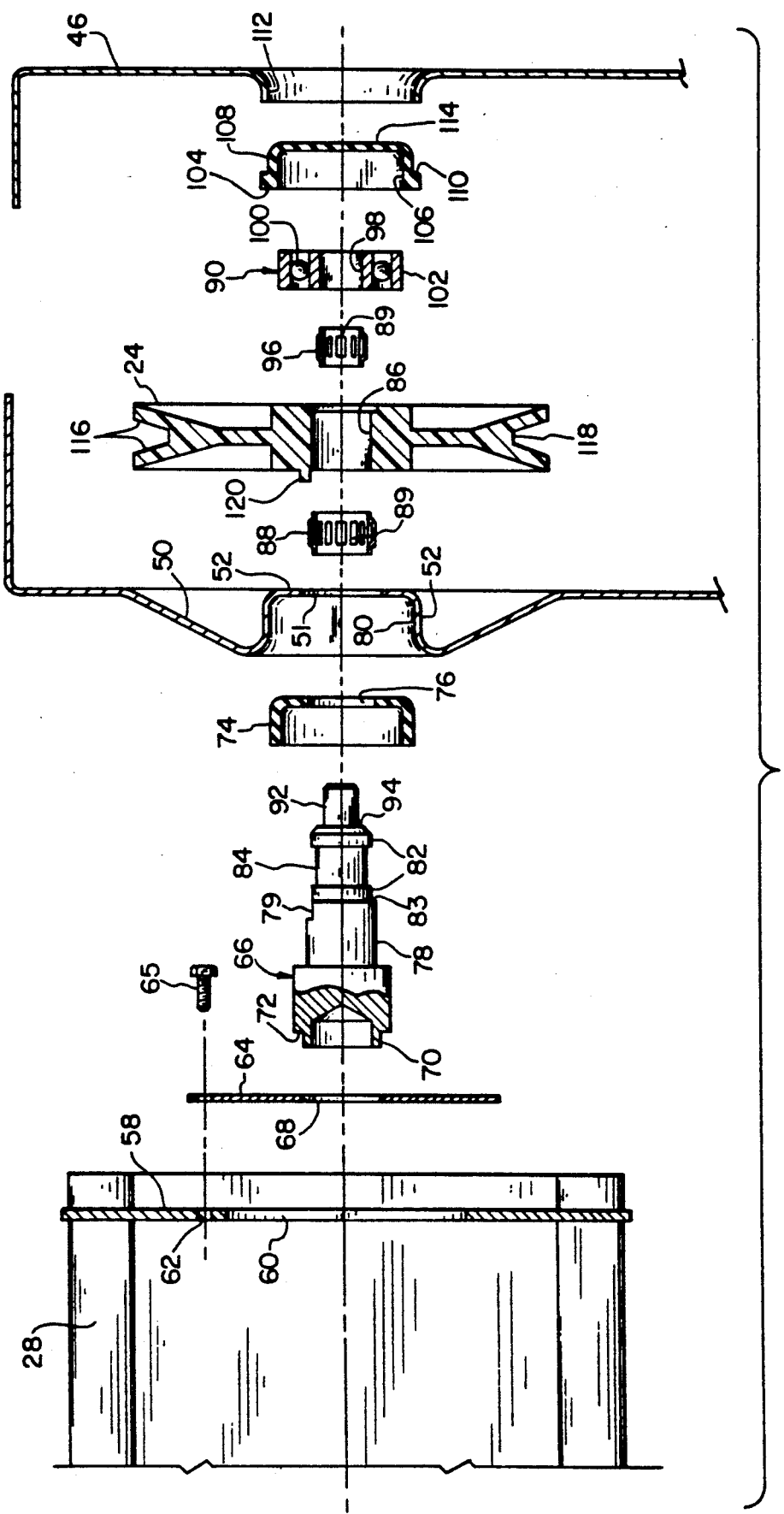
FIG. 5 is an exploded view of the pulley mounting and bearing system.
Figure 11:
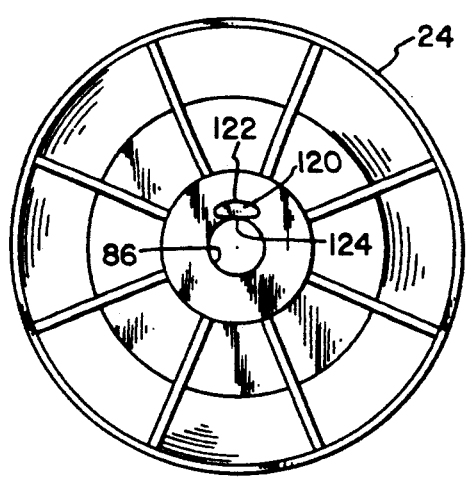
FIG. 11 is a front view of the pulley.
Figure 12:
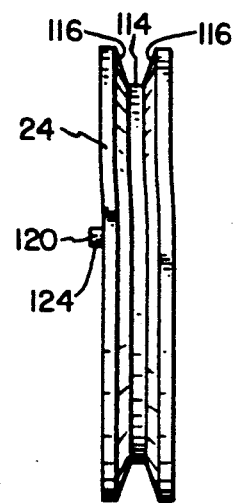
FIG. 12 is a side view of the pulley.

Pulley and bearing assembly 56 is respectively shown in an exploded and assembled condition in FIGS. 5 and 14. Tangential blower 28 includes end plate 58 secured thereto by appropriate means. End plate 58 includes opening 60 and a plurality of mounting holes 62, one of which is shown in FIG. 5. Blower disk 64 is secured to end plate 58 with a plurality of fasteners 65, one of which is shown. Fasteners 65 may be pop-rivets, screws, etc. providing attachment of end plate 58 to disk 64. Blower disk 64 includes a centrally located and generally circular shaped opening 68 allowing blower disk 64 to be secured to shaft end 66. Opening 68 is sized to slide over annular step portion 70 and engage shoulder 72 of shaft end 66. As may be seen in FIG. 14, annular step portion 70 is deformed radially outward by an appropriate stamping process to secure blower disk 64 to shaft end 66.

Although in the embodiment shown in FIGS. 5 and 14, blower disk 64 includes an opening 68 which engages the annular step portion 70 of shaft end 66, other methods of fixing blower disk 64 to shaft end 66 may be possible. For example, it may be possible to weld blower disk 64 to, or threadingly engage blower disk 64 with, shaft end 66. Such embodiments may require suitable changes allowing attachment of end plate 58 and/or blower disk 64.

Figure 9:
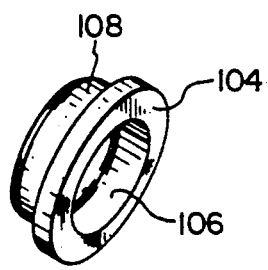
FIG. 9 is a perspective view of the bearing isolator.
Figure 10:
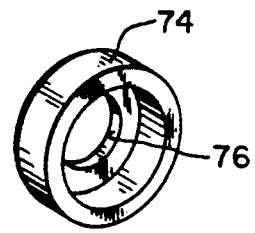
FIG. 10 is a perspective view of the shaft seal.
Figure 13:
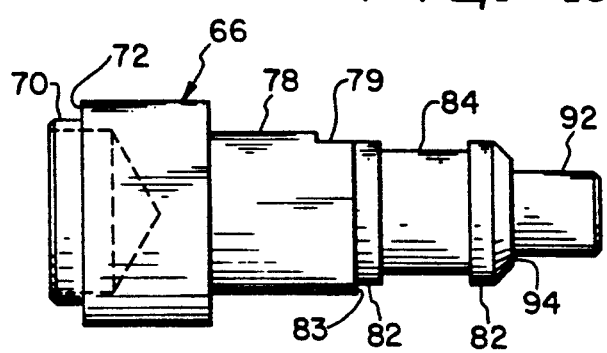
FIG. 13 is a side view of the blower shaft end.

Shaft seal 74 including central opening 76 (FIGS. 5, 9, and 14) is adapted to engage first stepped shoulder 78 formed in shaft end 66. In the embodiment shown, shaft end 66 is formed from aluminum and first stepped shoulder 78 is formed by a machining process, e.g., such as by turning on a lathe. Shaft end 66 could also be formed by a molding process, or other suitable machining processes.

First stepped shoulder 78 includes notched portion 79 having a cross section defining a portion of a semi-circle. Notched portion 79 matingly engages projection 120 of pulley 26, which engagement is described in more detail below.

Shaft seal 74 has an outer diameter allowing shaft seal 74 to be received within inner diameter 80 formed by raised portion 52. Shaft seal 74 is formed from a suitable material, such as a resilient rubber material. Shaft seal 74 preferably has an outer diameter allowing shaft seal 74 to frictionally engage inner diameter 80 of raised portion 52. Shaft seal 74 also includes a center opening 76 having a diameter about the same as the diameter of first stepped shoulder 78. Shaft seal 74 thus provides an effective fluid seal between shaft end 66 and access cover 44.

Figure 8:
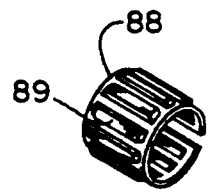
FIG. 8 is a perspective view of a tolerance ring of the pulley.

Shaft end 66 is provided with second stepped shoulder 82 having annular recess 84 formed therein. Annular recess 84 is adapted to receive tolerance ring 88 (FIGS. 5 and 8) which secures pulley 24 to shaft end 66. Tolerance ring 88 is of conventional design, such as an appropriately sized tolerance ring available through U.S.A. Tolerance Rings, West Trenton, N.J., U.S.A.

Tolerance ring 88 is generally a corrugated non-continuous strip of spring steel having a plurality of raised portions 89. Raised portions 89 exert a uniform force proportional to the amount of compression against both the annular recess 84 and inner hub diameter 86. The resilient and spring-like action of tolerance ring 88 provides a secure coupling, while allowing for convenient attachment and detachment of pulley 24. Tolerance ring 88 prevents movement of pulley 24 relative to shaft end 66 in both axial and radial directions during operation.

Pulley 24 is formed with projection 120 extending outwardly therefrom. Projection 120 has a cross-section with arcuate surface 122 adjoining generally straight surface 124. Projection 120, in other words, has a cross-section similar to a portion of a semi-circle. Arcuate surface 122 is formed with a curvature generally corresponding to the diameter of first stepped shoulder 78. Thus, as shown in FIG. 14, when pulley and first stepped shoulder 78 are assembled, projection 120 matingly engages notch 79 such that first stepped shoulder 78 has a generally uniform outer annular surface. Although not necessary for the rotational coupling of shaft end 66 and pulley 24, in the event of removal or failure of tolerance ring 88, projection 120 and notch 79 prevent relative rotational movement between pulley 24 and shaft end 66.

At the transition between the second and third stepped shoulders 82 and 92 respectively is abutment shoulder 94. Pulley 24 is further prevented from axial movement by abutment shoulder 83, which acts as a locating seat.

As may be seen in FIG. 14, frustoconical shaped recess 50 of access cover 44 extends through an opening formed in sidewall 21 into indoor compartment 29. Shaft seal 74 may thus be disposed around shaft end 66, while at the same time pulley 24 is disposed closely adjacent access cover 44. Recess 50 thus provides an offset which reduces the width of the belt and pulley assembly 56 from sidewall 21.

Secured to shaft end 66 outboard of pulley 24 is bearing 90. Referring to FIGS. 5 and 14, shaft end 66 is formed with third stepped shoulder 92 outboard of second stepped shoulder 82. Tolerance ring 96 is adapted to secure bearing 90 to third stepped shoulder 92. Tolerance ring 96 is also of conventional design and includes a plurality of raised portions 97 exerting uniform force against the third stepped shoulder 92 and inner race 98 of bearing 90. The resilient and spring-like action of tolerance ring 96 provides a secure rotational coupling, while allowing for convenient attachment and detachment of bearing 90. Further, the limited thermal contact of raised portions 97 inhibits heat transfer between shaft end 66 and inner race 98. Tolerance ring 96 prevents relative movement between inner race 98 and third stepped shoulder 92 in both axial and radial directions.

Figure 6:
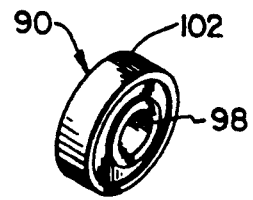
FIG. 6 is a perspective view of the blower shaft bearing.
Figure 7:
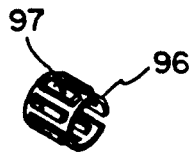
FIG. 7 is a perspective view of the tolerance ring of the bearing.

Bearing 90 (FIG. 6) is of conventional design having inner race 98, a plurality of balls 100, and outer race 102. Inner race 98 has a diameter which provides engagement of tolerance ring 96 and thereby secures bearing 90 to third stepped shoulder 92. In an alternative embodiment (not shown), the bearing may include roller rather than ball bearings.

Disposed between bearing 90 and bearing panel 46 is isolator 104. Isolator 104 is formed from a resilient material, such as a suitable rubber compound, and accommodates tolerances in both axial and radial directions. Isolator 104 has inner diameter 106 which engages outer race 102 of bearing 90. Stepped surface 108 and shoulder 110 are adapted to engage opening 112 formed in bearing panel 46. End portion 114 of isolator 104 prevents air, moisture, contaminants or the like from flowing through bearing 90 and depositing on the plurality of balls 100.

Belt 48 has a generally circular cross-section and is adapted to engage both bottom flat surface 118 and two side surfaces 116 of pulley 24 which form a generally v-shaped groove for receiving belt 48.

Tolerance rings 88 and 96 provide primary coupling of pulley 24 and bearing 90, respectively, and notch 79 and projection 120 provide secondary coupling. Tolerance rings 88 and 90 provide even torsional loading between tolerance rings 88 and 90, and pulleys 24 and/or 26 and bearing 90. Moreover, tolerance ring 96 inhibits heat transfer to bearing 90. Other resilient, spring-like devices for coupling shaft end 66 to pulleys 24 and/or 26 and bearing 90 providing a similar connection are also within the scope of this invention.

In the embodiment shown in the drawings, second stepped shoulder 82 has a diameter which is slightly less than inner hub diameter 86 of pulleys 24 and 26. Moreover, each pulley 24 and 26 is part of a similar pulley and bearing assembly 56 with like-formed shaft ends 66,. However, it may also be possible and/or desirable to provide shaft ends 66 having different corresponding diameters for respectively engaging pulleys 24 and 26.

In operation, PTAC 10 is activated by a control unit disposed under control cover 40. The control unit operably controls the motor to rotate one of the blowers respectively affixed to pulleys 24 and 26. The tangential blower driven by the motor transfers rotational motion to the corresponding pulley which in turn transmits the rotational motion to the other pulley via belt 48. The particular pulley receiving rotational motion from belt 48 then transfers the rotational motion via the associated shaft end to the tangential blower affixed thereto.

As the blowers are rotating, shaft seal 74 inhibits flow of air, water and contaminants into the corresponding indoor or outdoor compartment and isolator 104 prevents air, water, or other contaminants from flowing through bearing 90.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An air conditioner comprising:
    an air handling housing defining first and second compartments, said housing including a sidewall;
    a first and second tangential blower disposed in said first and second compartments, respectively, each said tangential blower defining an axis and having a coaxially disposed shaft end mounted in said sidewall;
    motor means for driving said first and second tangential blowers;
    coupling means for rotatably connecting said first and second tangential blowers, said coupling means including a belt and two pulleys, said belt engaging said pulleys, each said pulley mounted on a respective one of said shaft ends and being disposed outside of said first and second compartments;

a support plate attached to said sidewall and spaced apart from said sidewall, said belt and pulleys being disposed within a space between said sidewall and said support plate; and means for frictionally engaging one of said pulleys on a respective one of said shaft ends, said frictionally engaging means disposed between the inner diameter of said one pulley and the outer diameter of said respective one of said shaft ends whereby the axial distance occupied by said one pulley in said space between said sidewall and said support plate is minimized.

2. The air conditioner of claim 1 wherein said frictionally engaging means includes a tolerance ring having a plurality of raised portions.

3. The air conditioner of claim 1 wherein said shaft end includes a recess adapted to receive said frictionally engaging means, and said shaft end includes an annular extension adapted to abut said respective pulley.

4. The air conditioner of claim 1 further comprising bearing means for supporting at least one of said shaft ends, said bearing means including resilient, spring-like means for frictionally engaging said respective shaft end, whereby said bearing engaging means inhibits heat transfer from said shaft end to said bearing means.

5. The air conditioner of claim 4 wherein said bearing engaging means includes a tolerance ring having a plurality of raised portions.

6. The air conditioner of claim 1, wherein each of said two pulleys includes a projection and each respective said shaft end includes a mating notch, each said projection and said respective notch interlocking when assembled to prevent relative rotational movement between said pulley and said shaft end.

7. The air conditioner of claim 6 wherein each said shaft end includes a first stepped shoulder, said notch located in said first stepped shoulder, and said projection and said notch each have a contour in cross section generally defining a portion of a semi-circle.

8. An air conditioner comprising:
an air handling housing defining first and second compartments, said housing including a sidewall;
a first and second tangential blower disposed in said first and second compartments, respectively, each said tangential blower defining an axis and having a coaxially disposed shaft end mounted in said sidewall;
motor means for driving said first and second tangential blowers;
coupling means for rotatably connecting said first and second tangential blowers, said coupling means including a belt and two pulleys, said belt engaging said pulleys, each said pulley mounted on a respective one of said shaft ends;
a support plate attached to said sidewall and spaced apart from the plane defined by said sidewall, said belt and pulleys being disposed outside said first and second compartments and between said sidewall and said support plate; and
bearing means for supporting one of said shaft ends, said bearing means being spaced away from the plane defined by said sidewall and supported by said support plate, said bearing means including means for frictionally engaging said respective shaft end, whereby said frictionally engaging means inhibits heat transfer from said one shaft end to said bearing means.

9. The air conditioner of claim 8 wherein said frictionally engaging means includes a tolerance ring having a plurality of raised portions.

10. The air conditioner of claim 8 wherein said one shaft end includes a recess adapted to receive said frictionally engaging means.

11. The air conditioner of claim 10 wherein said frictionally engaging means includes a tolerance ring.

12. The air conditioner of claim 8 wherein said bearing means comprises an outer race and an inner race, said outer race is connected to said support plate, and said inner race is connected to said shaft end.

13. The air conditioner of claim 12 further comprising an isolator, and said isolator is disposed between said outer race and said support plate.

14. The air conditioner of claim 12 further comprising a resilient element for mounting said outer race to said support plate, said resilient element adapted to accommodate slight axial and radial misalignment of said shaft end.

15. An air conditioner comprising:
an air handling housing defining first and second compartments, said housing including a sidewall;
a first and second tangential blower disposed in said first and second compartments, respectively, each said tangential blower defining an axis with a coaxially disposed shaft end mounted in said sidewall;
motor means for driving said first and second tangential blowers;
coupling means for rotatably connecting said first and second tangential blowers, said coupling means including a belt and two pulleys, said belt engaging said pulleys, each said pulley mounted on a respective one of said shaft ends, said pulleys being disposed outside of said first and second compartments; and
bearing means for rotatably supporting one of said shaft ends, said bearing means disposed in said one shaft end and located away from the plane defined by said sidewall, said bearing means including a support plate spaced from said sidewall, said pulleys being disposed between said sidewall and said support plate whereby the spacing of said support plate away from said sidewall inhibits heat transfer from said first and second compartments to said bearing means.

16. The air conditioner of claim 15 wherein each said shaft end includes resilient, spring-like means for frictionally engaging said respective pulley on said respective shaft end.

17. The air conditioner of claim 15 wherein each said shaft end includes a tolerance ring having a plurality of raised portions for frictionally engaging said respective pulley on said respective shaft end.

18. The air conditioner of claim 17 wherein at least one of said shaft ends includes a recess adapted to receive said tolerance ring.

19. The air conditioner of claim 15 wherein said bearing means includes a tolerance ring having a plurality of raised portions for rotationally engaging said respective shaft end, whereby said tolerance ring inhibits heat transfer from said shaft end to said bearing means.

20. The air conditioner of claim 15 wherein each said shaft end includes a tolerance ring having a plurality of raised portions for rotationally engaging said pulleys on said respective shaft ends, said bearing means includes a tolerance ring having a plurality of raised portions for rotationally engaging said one shaft end, whereby said tolerance ring inhibits heat transfer from said shaft end to said bearing means.

21. The air conditioner of claim 15 wherein said bearing means further includes an outer race and an inner race, said outer race is connected to said support plate, and said inner race is connected to said shaft end.

22. The air conditioner of claim 21 further comprising an isolator, and said isolator is disposed between said outer race and said support plate.

23. The air conditioner of claim 21 further including a resilient element for mounting said outer race to said support plate, said resilient element accommodating slight axial and radial misalignment of said one shaft end.

24. An air conditioner comprising:
an air handling housing defining first and second compartments, said housing including a sidewall;
a first and second tangential blower disposed in said first and second compartments, respectively, each said tangential blower defining an axis and having a coaxially disposed shaft end mounted in said sidewall;
motor means for driving said first and second tangential blowers;
coupling means for rotatably connecting said first and second tangential blowers, said coupling means including a belt and two pulleys, said belt engaging said pulleys, each said pulley mounted on a respective one of said shaft ends;
bearing means for supporting one of said shaft ends; and
a support plate spaced away from said sidewall, said bearing means including an outer race, an inner race, and an isolator, said outer race being connected to said support plate, said inner race being connected to said shaft end, and said isolator being disposed between said outer race and said support plate, said bearing means including means for frictionally engaging said respective shaft end, whereby said frictionally engaging means inhibits heat transfer from said one shaft end to said bearing means.

25. An air conditioner comprising:
an air handling housing defining first and second compartments, said housing including a sidewall;
a first and second tangential blower disposed in said first and second compartments, respectively, each said tangential blower defining an axis with a coaxially disposed shaft end mounted in said sidewall;
motor means for driving said first and second tangential blowers;
coupling means for rotatably connecting said first and second tangential blowers, said coupling means including a belt and two pulleys, said belt engaging said pulleys, each said pulley mounted on a respective one of said shaft ends; and
bearing means for rotatably supporting one of said shaft ends, said bearing means disposed on said one shaft end and including a support plate spaced from said sidewall, said bearing means further including an outer race, an inner race, and a resilient element, said outer race being connected to said support plate, said inner race being connected to said shaft end, and said resilient element mounting said outer race to said support plate, said resilient element accommodating slight axial and radial misalignment of said one shaft end, whereby said support plate inhibits heat transfer from said first and second compartments to said bearing means.

* * * * *

UNITED STATES PATENT AND TRADEMARK OFFICE
CERTIFICATE OF CORRECTION

PATENT NO. : 5,272,889

DATED : December 28, 1993

INVENTOR(S) : James E. Harris

It is certified that error appears in the above-identified patent and that said Letters Patent is hereby corrected as shown below:

Column 3, line 15, change "most" to --moist--.

Signed and Sealed this

Twelfth Day of July, 1994

Attest:

BRUCE LEHMAN

Attesting Officer

Commissioner of Patents and Trademarks